US011527757B2

(12) United States Patent
Nakayama et al.

(10) Patent No.: US 11,527,757 B2
(45) Date of Patent: Dec. 13, 2022

(54) SECONDARY BATTERY (71) Applicant: Panasonic Intellectual Property Management Co., Ltd., Osaka (JP)

(72) Inventors: Takahito Nakayama, Osaka (JP); Tomoki Shiozaki, Osaka (JP); Hideharu Takezawa, Nara (JP); Daisuke Furusawa, Osaka (JP); Yuji Oura, Osaka (JP); Takahiro Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 167 days.

(21) Appl. No.: 16/580,195

(22) Filed: Sep. 24, 2019

(65) Prior Publication Data
US 2020/0020950 A1 Jan. 16, 2020

Related U.S. Application Data (63) Continuation of application No. PCT/JP2018/004545, filed on Feb. 9, 2018.

(30) Foreign Application Priority Data

Mar. 29, 2017 (JP) .............................. JP2017-065805

(51) Int. Cl.
*H01M 4/62* (2006.01)
*H01M 4/13* (2010.01)
(Continued)

(52) U.S. Cl.
CPC ............. *H01M 4/628* (2013.01); *H01M 4/13* (2013.01); *H01M 4/362* (2013.01); *H01M 4/663* (2013.01);
(Continued)

(58) Field of Classification Search
CPC ........ H01M 4/13; H01M 4/131; H01M 4/362; H01M 4/525; H01M 4/62; H01M 4/625;
(Continued)

(56) References Cited

U.S. PATENT DOCUMENTS

2008/0254355 A1  10/2008  Muraoka et al.
2010/0308278 A1  12/2010  Kepler et al.
(Continued)

FOREIGN PATENT DOCUMENTS

CN   101908625 A   12/2010
CN   105742573 A    7/2016
(Continued)

OTHER PUBLICATIONS

JP 2016127000—Translation.*
(Continued)

*Primary Examiner* — Brittany L Raymond
(74) *Attorney, Agent, or Firm* — WHDA, LLP (57) ABSTRACT

A positive electrode used in a secondary cell that is an example of the present embodiment is provided with a positive electrode collector, an intermediate layer formed on the positive electrode collector, and a positive electrode mixture layer formed on the intermediate layer. The positive electrode mixture layer has a thermally expandable material and a positive electrode active material. The thermally expandable material content of the positive electrode mixture layer is at least 0.1% by mass and less than 5% by mass. The intermediate layer has an insulating inorganic material and a conductive agent. The insulating inorganic material content of the intermediate layer is 80-99% by mass.

12 Claims, 2 Drawing Sheets

(51) Int. Cl.
*H01M 4/36* (2006.01)
*H01M 4/66* (2006.01)
*H01M 10/0525* (2010.01)
*H01M 4/02* (2006.01)

(52) U.S. Cl.
CPC ....... *H01M 4/667* (2013.01); *H01M 10/0525* (2013.01); *H01M 2004/028* (2013.01)

(58) Field of Classification Search
CPC ...... H01M 4/628; H01M 4/663; H01M 4/666; H01M 4/667; H01M 2004/028; H01M 10/0525; Y02E 60/10
See application file for complete search history.

(56) References Cited

U.S. PATENT DOCUMENTS

| | | | |
|---|---|---|---|
| 2013/0164635 A1* | 6/2013 | Schmidt | H01M 4/133 429/337 |
| 2015/0118553 A1 | 4/2015 | Kato et al. | |
| 2015/0333324 A1* | 11/2015 | Umeyama | H01M 4/1397 429/221 |
| 2016/0190566 A1 | 6/2016 | Shiozaki et al. | |

FOREIGN PATENT DOCUMENTS

| | | |
|---|---|---|
| JP | 2001-332245 * | 11/2001 |
| JP | 2001-332245 A | 11/2001 |
| JP | 2003-031208 A | 1/2003 |
| JP | 2008-262785 A | 10/2008 |
| JP | 2016-126901 A | 7/2016 |
| JP | 2016-127000 A | 7/2016 |
| WO | 2013/172257 A1 | 11/2013 |

OTHER PUBLICATIONS

English translation of JP Publication 2001-332245, Nov. 2001.*
International Search Report dated Mar. 13, 2018, issued in counterpart application No. PCT/JP2018/004545, with English translation. (3 pages).
English Translation of Search Report dated Dec. 28, 2021, issued in counterpart CN Application No. 201880016989.1. (2 pages).

* cited by examiner

SECONDARY BATTERY

TECHNICAL FIELD

The present disclosure relates to a technology of a secondary battery.

BACKGROUND ART

In recent years, as a secondary battery with high output and high energy density, a non-aqueous electrolyte secondary battery has been widely used, the battery comprising a positive electrode, a negative electrode, and a non-aqueous electrolyte wherein lithium ions are transferred between the positive electrode and the negative electrode to perform charge and discharge.

For example, Patent Literature 1 proposes a non-aqueous electrolyte secondary battery comprising a positive electrode having a positive electrode current collector and a positive electrode mixture layer formed on the positive electrode current collector, wherein a thermally expandable material is added to the positive electrode mixture layer. Patent Literature 1 discloses that when a non-aqueous electrolyte secondary battery causes a thermal runaway due to an unexpected situation and the inside of the non-aqueous electrolyte secondary battery reaches a predetermined temperature or more, a thermally expandable material thermally expands to separate the positive electrode mixture layer from the positive electrode current collector, thereby blocking the electrical connection between the positive electrode mixture layer and the positive electrode current collector.

CITATION LIST

Patent Literature

Patent Literature 1: Japanese Unexamined Patent Application Publication No. 2003-31208

SUMMARY

When for example conductive foreign matter such as a nail or a metal fragment pierces a non-aqueous electrolyte secondary battery to cause an internal short circuit, the heat generation rate of the non-aqueous electrolyte secondary battery is very fast because a rapid drop in resistance occurs. Therefore, in the technology of Patent Literature 1, when an internal short circuit occurs, the battery temperature may be high before the thermally expandable material thermally expands to block the electrical connection between the positive electrode mixture layer and the positive electrode current collector. As a result, it becomes difficult to suppress a rise in heat generation temperature of the battery, that is, to reduce the highest attainable temperature of the non-aqueous electrolyte secondary battery.

An object of the present disclose is to provide a secondary battery capable of suppressing a rise in heat generation temperature of the secondary battery due to an internal short circuit, that is, capable of reducing the highest attainable temperature of the secondary battery.

The secondary battery according to one aspect of the present disclosure has a positive electrode, a negative electrode, and an electrolyte, wherein the positive electrode comprises a positive electrode current collector, an intermediate layer formed on the positive electrode current collector, and a positive electrode mixture layer formed on the intermediate layer; the positive electrode mixture layer has a thermally expandable material and a positive electrode active material; the content of the thermally expandable material in the positive electrode mixture layer is 0.1 mass % or more and less than 5 mass %; the intermediate layer has an insulating inorganic material and a conductive agent; and the content of the insulating inorganic material in the intermediate layer is 80 mass % or more and 99 mass % or less.

The secondary battery according to one aspect of the present disclosure has a positive electrode, a negative electrode, and an electrolyte, wherein the positive electrode comprises a positive electrode current collector, an intermediate layer formed on the positive electrode current collector, and a positive electrode mixture layer formed on the intermediate layer; the positive electrode mixture layer has a positive electrode active material; the intermediate layer has a thermally expandable material and an insulating inorganic material; the content of the insulating inorganic material in the intermediate layer is 80 mass % or more and 99 mass % or less; and the content of the insulating inorganic material in the intermediate layer is 0.1 mass % or more and less than 5 mass %.

According to one aspect of the present disclosure, it is possible to suppress a rise in the heat generation temperature of the secondary battery due to an internal short circuit, that is, to reduce the highest attainable temperature of the secondary battery.

DESCRIPTION OF EMBODIMENTS

A positive electrode used in the secondary battery according to one aspect of the present disclosure comprises a positive electrode current collector, an intermediate layer formed on the positive electrode current collector, and a positive electrode mixture layer formed on the intermediate layer, wherein the positive electrode mixture layer has a thermally expandable material and a positive electrode active material; the content of the thermally expandable material in the positive electrode mixture layer is 0.1 mass % or more and less than 5 mass %; the intermediate layer has an insulating inorganic material and a conductive agent; and the content of the insulating inorganic material in the intermediate layer is 80 mass % or more and 99 mass % or less. As described above, the intermediate layer including a predetermined amount of the insulating inorganic material is provided between the positive electrode current collector and the positive electrode mixture layer, and thereby the insulating inorganic material in the intermediate layer becomes a resistance component between the positive electrode current collector and the positive electrode mixture layer to suppress a rapid drop in resistance, reducing heat generation rate (temperature rising rate) of the secondary battery, when an internal short circuit occurs due to conductive foreign matter. As a result, the thermally expandable material included in a predetermined amount in the positive electrode mixture layer thermally expands before the battery temperature of the secondary battery becomes high, and the positive electrode mixture layer and the intermediate layer are separated to enable blocking the electrical connection between the positive electrode mixture layer and the positive electrode current collector via the intermediate layer, thereby allowing suppression of a rise in heat generation temperature of the battery, that is, reduction in the highest attainable temperature of the secondary battery.

The positive electrode used for the secondary battery according to one aspect of the present disclosure comprises a positive electrode current collector, an intermediate layer formed on the positive electrode current collector, and a positive electrode mixture layer formed on the intermediate layer, wherein the positive electrode mixture layer has a positive electrode active material; the intermediate layer has a thermally expandable material and an insulating inorganic material; the content of the insulating inorganic material in the intermediate layer is 80 mass % or more and 99 mass % or less; and the content of the insulating inorganic material in the intermediate layer is 0.1 mass % or more and less than 5 mass %. As described above, the intermediate layer including a predetermined amount of the insulating inorganic material is provided between the positive electrode current collector and the positive electrode mixture layer, and thereby the insulating inorganic material in the intermediate layer becomes a resistance component between the positive electrode current collector and the positive electrode mixture layer to suppress a rapid drop in resistance, reducing heat generation rate (temperature rising rate) of the secondary battery, when an internal short circuit occurs due to conductive foreign matter. As a result, the thermally expandable material included in a predetermined amount in the intermediate layer thermally expands before the battery temperature of the secondary battery becomes high, and the positive electrode mixture layer and the intermediate layer or the positive electrode current collector and the intermediate layer are separated to enable blocking the electrical connection between the positive electrode mixture layer and the positive electrode current collector via the intermediate layer, thereby allowing suppression of a rise in heat generation temperature of the battery, that is, reduction in the highest attainable temperature of the secondary battery.

Hereinafter, exemplary embodiments will be described in detail. The drawings referred to in the description of the embodiments are schematically illustrated, and the dimensional ratio or the like of the components drawn in the drawings may be different from the actual one.

Figure 1:
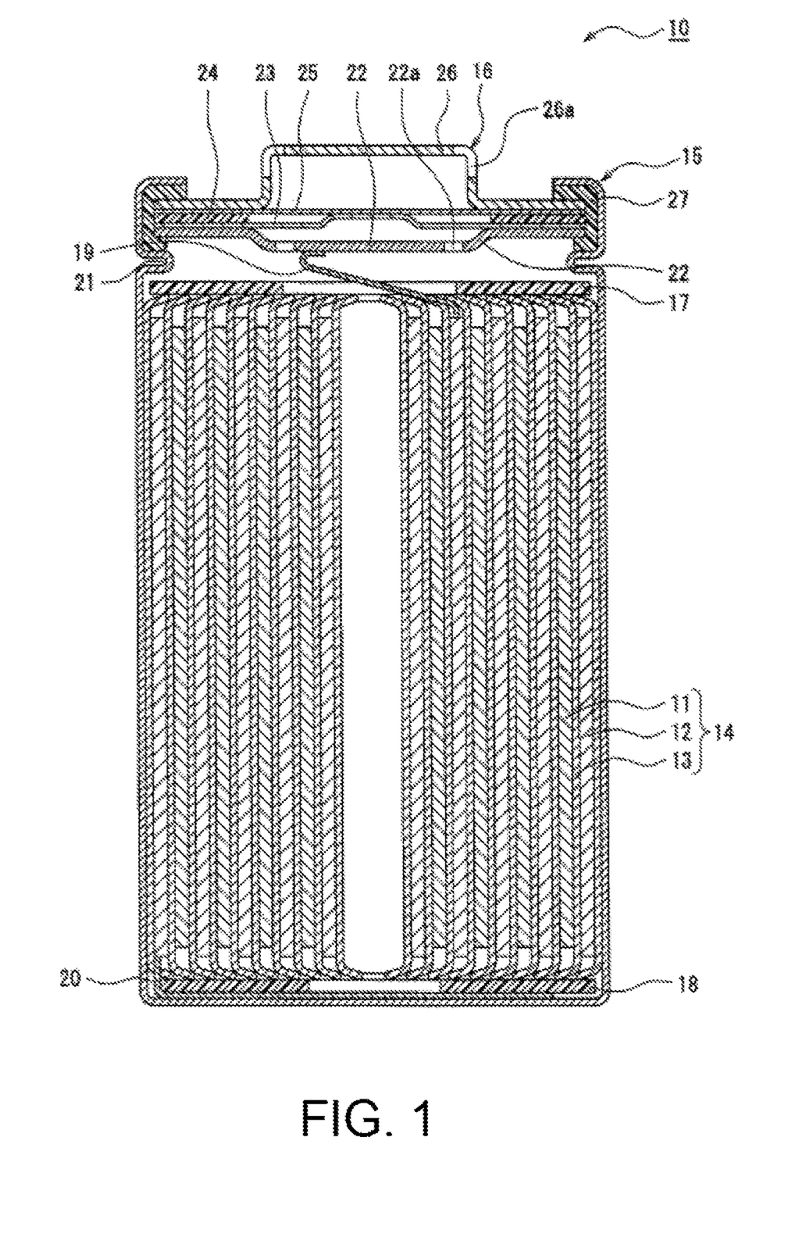
FIG. 1 is a sectional view of a secondary battery as one exemplary embodiment.

FIG. 1 is a cross-sectional view of a secondary battery as one exemplary embodiment. The secondary battery 10 shown in FIG. 1 comprises a wound electrode body 14 obtained by winding a positive electrode 11 and a negative electrode 12 via a separator 13; an electrolyte; insulating plates 17 and 18 disposed above and below the electrode body 14 respectively; and a battery case for accommodating the above members. The battery case is composed of a case main body 15 having a bottomed cylindrical shape and a sealing body 16. Instead of the wound electrode body 14, another form of an electrode body may be applied, such as a laminate electrode body in which a positive electrode and a negative electrode are alternately laminated via a separator. Examples of the battery case include a metallic case in a shape such as a cylindrical shape, a square shape, a coin shape, or a button shape and a resin case (laminated battery) formed by laminating a resin sheet.

The case main body 15 is, for example, a metal container with a bottomed cylindrical shape. A gasket 27 is provided between the case main body 15 and the sealing body 16 to ensure the sealability inside the battery case. The case main body 15 preferably has a projecting portion 21, which is formed for example by pressing the side surface portion from the outside, for supporting the sealing body 16. The projecting portion 21 is preferably formed in an annular shape along the circumferential direction of the case main body 15, and the sealing body 16 is supported on the upper surface thereof.

The sealing body 16 has a filter 22 in which a filter opening 22a is formed, and a valve body disposed on the filter 22. The valve body closes the filter opening 22a of the filter 22 and breaks when the internal pressure of the battery rises by heat generation due to an internal short circuit or the like. In the present embodiment, a lower valve body 23 and an upper valve body 25 are provided as valve bodies, and an insulating member 24 disposed between the lower valve body 23 and the upper valve body 25, and a cap 26 having a cap opening 26a are further provided. Each member constituting the sealing body 16 has a disk shape or ring shape, for example, and each member except the insulating member 24 is electrically connected to each other. Specifically, the filter 22 and the lower valve body 23 are joined together at their respective peripheral portions, and the upper valve body 25 and the cap 26 are also joined together at their respective peripheral portions. The lower valve body 23 and the upper valve body 25 are connected to each other at their respective central portions, and the insulating member 24 is interposed between the respective peripheral portions. When the internal pressure rises by heat generation due to an internal short circuit or the like, for example, the lower valve body 23 breaks at its thin portion, and thereby the upper valve body 25 bulges to the cap 26 side and leaves the lower valve body 23 to block both electrical connections.

In the secondary battery 10 shown in FIG. 1, a positive electrode lead 19 attached to the positive electrode 11 extends to the side of the sealing body 16 through the hole of the insulating plate 17, and a negative electrode lead 20 attached to the negative electrode 12 extends to the bottom side of the case main body 15 through the outside of insulating plate 18. For example, the positive electrode lead 19 is connected to the lower surface of the filter 22, which is a bottom plate of the sealing body 16, by welding or the like, and the cap 26, which is a top plate of the sealing body 16 electrically connected to the filter 22, serves as a positive electrode terminal. The negative electrode lead 20 is connected to the inner surface of bottom of the case main body 15, by welding or the like, and the case main body 15 serves as a negative electrode terminal.

[Positive Electrode]

Figure 2:
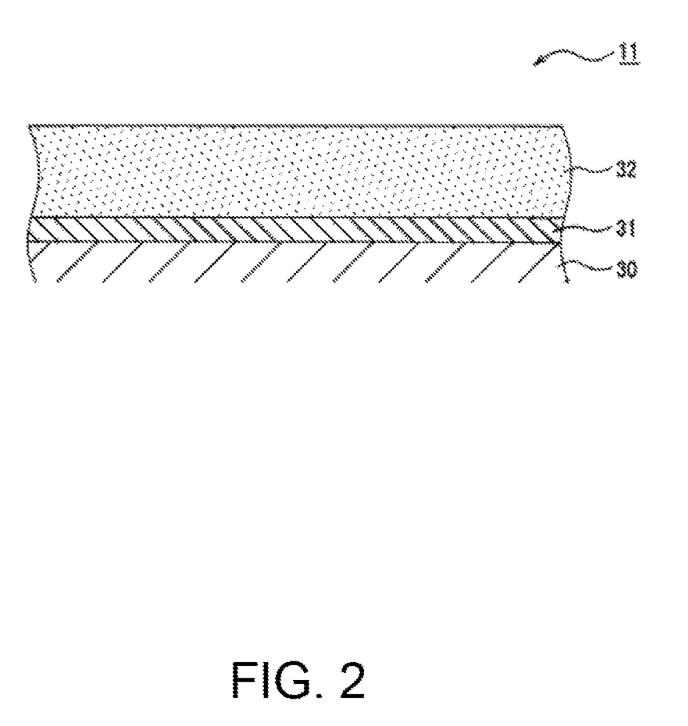
FIG. 2 is a sectional view of a positive electrode as one exemplary embodiment.

FIG. 2 is a cross-sectional view of a positive electrode as one exemplary embodiment. A positive electrode 11 comprises a positive electrode current collector 30, an intermediate layer 31 formed on the positive electrode current collector 30, and a positive electrode mixture layer 32 formed on the intermediate layer 31.

As the positive electrode current collector 30, a foil of a metal stable in the potential range of the positive electrode such as aluminum or an aluminum alloy, a film in which the metal is disposed on the surface, or the like can be used. The positive electrode current collector 30 has, for example, a thickness of about 10 μm to 100 μm.

The positive electrode mixture layer 32 includes a thermally expandable material and a positive electrode active material. The positive electrode mixture layer 32 preferably includes a binder, from the viewpoint that the positive electrode active materials can be bound to each other to ensure the mechanical strength of the positive electrode mixture layer 32, the binding property between the positive electrode mixture layer 32 and the intermediate layer 31 can be enhanced, or the like. The positive electrode mixture layer 32 preferably includes a conductive material from the viewpoint that the conductivity of the layer can be improved, or the like.

Examples of the positive electrode active material include lithium transition metal oxides containing transition metal elements such as Co, Mn, and Ni. Examples of lithium transition metal oxides include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M: at least one of Na, Mg, Sc, Y, Mn, Fe, Co, Ni, Cu, Zn, Al, Cr, Pb, Sb, and B, $0<x\leq1.2$, $0<y\leq0.9$, and $2.0\leq z\leq2.3$). These may be used singly or in combinations of two or more.

The thermally expandable material is a material that expands in volume due to heat when it reaches a predetermined temperature or more, and is a material that has larger volume expansion due to heat than other electrode constituent materials such as a positive electrode active material. A predetermined temperature desirably is in the range of 80° C. to 350° C., for example.

The content of the thermally expandable material in the positive electrode mixture layer 32 is not particularly limited as long as it is 0.1 mass % or more and less than 5 mass %, and the content is preferably 0.1 mass % or more and 1 mass % or less, from viewpoints such as being capable of further suppressing a rise in heat generation temperature of the secondary battery at the time of an internal short circuit. When the content of the thermally expandable material in the positive electrode mixture layer 32 is less than 0.1 mass %, even thermal expansion of the thermally expandable material at the time of an internal short circuit cannot sufficiently separate the positive electrode mixture layer 32 and the intermediate layer 31, and hence the electrical connection between the positive electrode mixture layer 32 and the positive electrode current collector 30 via the intermediate layer 31 is maintained to rise heat generation temperature of the secondary battery as compared to the case where the above range is satisfied. When the content of the thermally expandable material in the positive electrode mixture layer 32 is 5 mass % or more, the mass of the active material is relatively reduced, and the battery capacity is thus significantly reduced. In the case of the thermally expandable material having conductivity, the thermally expandable material itself becomes a short circuit material and generates heat, and hence heat generation temperature of the secondary battery rises as compared to the case where the above range is satisfied.

Examples of the thermally expandable material include at least one thermally expandable material selected from expanded graphite, thermally expanded microcapsule, a foaming agent, and the like. Among these, including expanded graphite is preferable from the viewpoints that the thermally expandable material itself functions as a conductive material and the input-output characteristics of the battery can be maintained.

Examples of expanded graphite include treated products obtained by treating natural graphite with concentrated sulfuric acid, nitric acid, or selenic acid, and concentrated nitric acid, perchlorate, permanganate, or dichromate. These are crystalline compounds having a graphitic layer structure, and when a predetermined temperature is reached, they are volumetrically expanded by a gas generated by heat to form a nonflammable carbonized layer. The average particle size of the expanded graphite is, for example, 1 to 500 The expansion volume of the expanded graphite is, for example, 10 to 300 mL/g.

The thermally expanded microcapsule is preferably one volumetrically expanded by the internal pressure that becomes a pressure enough for expanding the microcapsule due to vaporization of internal low boiling point liquid. Examples thereof include Expancel 051DU, 007WU, 053WU, 053DU, 054WU, 091DU, 091-080DU, 091-140DU, 092-120DU, 093-120DU, 820WU, 642WU, 551WU, 551DU, 551-20WU, 551-20DU, 551-80WU, 551-80DU, 461WU, 461DU, and 461-20 manufactured by Nippon Ferrite Co., Ltd.; and microcapsules manufactured by Matsumoto Yushi Co., Ltd. such as F-20, $F_30$, F-40, F-50, F-80S, F-82, F-85, and F-100.

Examples of the foaming agent include substances that undergo chemical decomposition (such as thermal decomposition), substances that sublime, and substances that boil, when reaching a predetermined temperature.

Examples of the foaming agent that undergoes chemical decomposition when reaching a predetermined temperature include sodium hydrogen carbonate, p,p'-oxybisbenzenesulfonyl hydrazide, azodicarbonamide, N, N'-dinitrosopentamethylenetetramine, and 4,4'-oxybis (benzenesulfonyl hydrazide).

Examples of the foaming agent that sublimes when reaching a predetermined temperature include naphthalene, 1,7,7-trimethylbicyclo[2.2.1]heptane-2-one, dry ice, and iodine.

Examples of the foaming agent that boils when reaching a predetermined temperature include hydrocarbons (propane, n-butane, n-pentane, isohexane, cyclohexane, n-octane, isooctane, benzene, toluene, xylene, ethylbenzene, amylbenzene, turpentine, pinene, and the like); halogenated hydrocarbons (methyl chloride, chloroform, carbon tetrachloride, ethylene chloride, methyl bromide, ethyl bromide, chlorobenzene, chlorobromomethane, bromobenzene, fluorodichloromethane, dichlorodifluoromethane, difluorochloroethane, and the like); alcohol (methanol, ethanol, n-propanol, isopropanol, n-amyl alcohol, isoamyl alcohol, n-hexanol, n-heptanol, 2-octanol, n-dodecanol, nonanol, cyclohexanol, glycidol, and the like); ether, acetal (ethyl ether, dichloroethyl ether, isopropyl ether, n-butyl ether, diisoamyl ether, methyl phenyl ether, ethyl benzyl ether, furan, furfural, 2-methyl furan, cineole, methylal); ketones (acetone, methyl ethyl ketone, methyl n-propyl ketone, methyl n-amyl ketone, diisobutyl ketone, phorone, isophorone, cyclohexanone, acetophenone, and the like); esters (methyl formate, ethyl formate, propyl formate, methyl acetate, ethyl acetate, propyl acetate, n-amyl acetate, methyl cyclohexyl acetate, methyl butyrate, ethyl butyrate, ethyl butyrate, propyl butyrate, butyl stearate, and the like); polyhydric alcohol and derivatives thereof (ethylene glycol, ethylene glycol monomethyl ether, ethylene glycol monomethyl ether acetate, ethylene glycol monoethyl ether, methoxymethoxyethanol, ethylene glycol monoacetate, diethylene glycol, diethylene glycol monomethyl ether, propylene glycol, propylene glycol monoethyl ether, and the like); fatty acids and phenols (formic acid, acetic acid, acetic anhydride, propionic acid, propionic acid anhydride, butyric acid, isovaleric acid, phenol, cresol, o-cresol, xylenol, and the like); nitrogen compounds (nitromethane, nitroethane, 1-nitropropane, nitrobenzene, monomethylamine, dimethylamine, trimethylamine, monoethylamine, diamylamine, aniline, monomethylaniline, o-toluidine, o-chloroaniline, diclohexylamine, dicyclohexylamine, monoethanol amine, formamide, N, N-dimethylformamide, acetamide, acetonitrile, pyridine, α-picoline, 2,4-lutidine, quinoline, morpholine, and the like); sulfur, phosphorus, other compounds (carbon disulfide, dimethyl sulfoxide, 4,4-diethyl-1,2-dithiolane, dimethyl sulfide, dimethyl disulfide, methanethiol, propane sultone, triethyl phosphate, triphenyl phosphate, diethyl carbonate, carbonate ethylene, amyl borate, and the like), inorganic solvents (liquid ammonia, silicone oil, and the like); and liquids such as liquid metal, water, and the like.

Examples of the conductive material include carbon materials such as carbon black (CB), acetylene black (AB), ketjen black, and graphite. These may be used singly or in combinations of two or more.

Examples of the binder include fluorine resins such as polytetrafluoroethylene (PTFE) and polyvinylidene fluoride (PVdF), polyacrylonitrile (PAN), polyimide resins, acrylic resins, and polyolefin resins. These resins may be used in combination with carboxymethylcellulose (CMC) or a salt thereof (CMC-Na, CMC-K, CMC-NH$_4$, and the like, or a partially neutralized salt may be used), and polyethylene oxide (PEO). These may be used singly or in combinations of two or more.

The intermediate layer 31 includes an insulating inorganic material and a conductive material. The content of the insulating inorganic material in the intermediate layer 31 is 80 mass % or more and 99 mass % or less. The intermediate layer 31 preferably includes the binder from the viewpoints such that the intermediate layer 31 bonds the insulating inorganic material and the conductive material to ensure the mechanical strength of the intermediate layer 31 or improves the binding property between the intermediate layer 31 and the positive electrode current collector 30.

The content of the insulating inorganic material in the intermediate layer 31 is not particularly limited as long as it is 80 mass % or more and 99 mass % or less, and is more preferably 90 mass % or more and 99 mass % or less, from viewpoints such as being capable of further suppressing a rise in heat generation temperature of the battery due to an internal short circuit. When the content of the insulating inorganic material in the intermediate layer 31 is less than 80 mass %, the rapid resistance drop cannot be sufficiently suppressed in a case where the internal short circuit due to the conductive foreign matter occurs, and the heat generation rate of the secondary battery is increased, and thereby the heat generation temperature of the battery is increased as compared to a case where the above range is satisfied. When the content of the insulating inorganic material in the intermediate layer 31 exceeds 99 mass %, the conductivity of the intermediate layer 31 is reduced as compared to a case where the above range is satisfied, which may not ensure enough electrical continuity between the positive electrode mixture layer 32 and the positive electrode current collector 30 via the intermediate layer 31 in a normal case where no internal short circuit occurs.

The insulating inorganic material is preferably, for example, an inorganic material having a resistivity of $10^{12}$ Ωcm or more, and examples thereof include metal oxides, metal nitrides, and metal fluorides. Examples of the metal oxide include aluminum oxide, titanium oxide, zirconium oxide, silicon oxide, manganese oxide, magnesium oxide, and nickel oxide. Examples of the metal nitride include boron nitride, aluminum nitride, magnesium nitride, and silicon nitride. Examples of the metal fluoride include aluminum fluoride, lithium fluoride, sodium fluoride, magnesium fluoride, calcium fluoride, barium fluoride, aluminum hydroxide, and boehmite. The insulating inorganic material preferably includes at least one of aluminum oxide, titanium oxide, silicon oxide, and manganese oxide, and more preferably includes at least aluminum oxide, from the viewpoints such as insulating property, high melting point, and lower oxidizing power than a positive electrode active material. When an internal short circuit occurs, the redox reaction between the positive electrode active material and the positive electrode current collector (especially aluminum or aluminum alloy) may increase the heat generation amount of the battery, but the above redox reaction can be suppressed by using the insulating inorganic material having lower oxidizing power than the positive electrode active material. As a result, it is possible to further suppress a rise in the heat generation temperature of the battery due to an internal short circuit, that is, to further reduce the highest attainable temperature of the battery.

As the conductive material included in the intermediate layer 31, one that is the same as the conductive material applied to the positive electrode mixture layer 32 can be used, for example a carbon material such as carbon black (CB), acetylene black (AB), ketjen black, or graphite. These may be used singly or in combinations of two or more. The content of the conductive material in the intermediate layer 31 is, for example, preferably 0.1 mass % to 10 mass %, and more preferably 1 mass % to 5 mass %, from the viewpoint of ensuring the conductivity of the intermediate layer 31.

As the binder included in the intermediate layer 31, one that is the same as the conductive material applied to the positive electrode mixture layer 32 can be used, for example fluorine resins such as polytetrafluoroethylene (PTFE) and polyvinylidene fluoride (PVdF), polyacrylonitrile (PAN), polyimide resin, acrylic resin, and polyolefin resin. These may be used singly or in combinations of two or more. The content of the binder in the intermediate layer 31 is, for example, preferably 0.1 mass % to 5 mass %, and more preferably 1 mass % to 3 mass %.

The thickness of the intermediate layer 31 is, for example, preferably 1 μm or more, and more preferably 1 μm to 5 μm. The thickness of the intermediate layer 31 is less than which may increase the heat generation temperature of the secondary battery in a case where an internal short circuit occurs, as compared to a case where the above range is satisfied. The thickness of the intermediate layer 31 exceeds 5 μm, which may increase the resistance between the positive electrode mixture layer 32 and the positive electrode current collector 30 in a normal case where no internal short circuit occurs to deteriorate the output characteristics of the battery, as compared to a case where the above range is satisfied.

The positive electrode 11 is obtained, for example, by applying a slurry for the intermediate layer including the insulating inorganic material, the conductive material, and the binder on the positive electrode current collector 30; drying the obtained film to form the intermediate layer 31; by applying and drying, thereon, the positive electrode mixture slurry including the positive electrode active material, the thermally expandable material, the binder, and the like to form the positive electrode mixture layer 32; and rolling the positive electrode mixture layer 32. The positive electrode mixture layer 32 and the intermediate layer 31 may be provided on both surfaces of the positive electrode current collector 30.

The present embodiment shows examples of the positive electrode including the thermally expandable material in the positive electrode mixture layer, and the positive electrode may include the thermally expandable material in the intermediate layer. Specifically, the positive electrode includes the positive electrode current collector, the intermediate layer formed on the positive electrode current collector, and the positive electrode mixture layer formed on the intermediate layer. The positive electrode mixture layer includes the positive electrode active material (as appropriate, the binder, the conductive material, and the like are included). The intermediate layer includes the above insulating inorganic material and the above thermally expandable material (as appropriate, the binder and the like are included).

The content of the insulating inorganic material in the intermediate layer is not particularly limited as long as it is 80 mass % or more and 99 mass % or less, and the content is preferably 90 mass % or more and 99 mass % or less, from viewpoints such as being capable of further suppressing a rise in heat generation temperature of the battery due to an internal short circuit. When the content of the insulating inorganic material in the intermediate layer is less than 80 mass %, the rapid resistance drop cannot be sufficiently suppressed in a case where the internal short circuit due to the conductive foreign matter occurs, and the heat generation rate of the secondary battery is increased, and thereby the heat generation temperature of the battery is increased as compared to a case where the above range is satisfied. When the content of the insulating inorganic material in the intermediate layer exceeds 99 mass %, the conductivity of the intermediate layer is reduced as compared to a case where the above range is satisfied, which may not ensure enough electrical continuity between the positive electrode mixture layer and the positive electrode current collector via the intermediate layer in a normal case where no internal short circuit occurs.

The content of the thermally expandable material in the intermediate layer is not particularly limited as long as it is 0.1 mass % or more and less than 5 mass %, and the content is preferably 0.1 mass % or more and 1 mass % or less, from viewpoints such as being capable of further suppressing a rise in heat generation temperature of the secondary battery at the time of an internal short circuit. When the content of the thermally expandable material in the intermediate layer is less than 0.1 mass %, even thermal expansion of the thermally expandable material at the time of an internal short circuit cannot sufficiently separate the positive electrode mixture layer and the intermediate layer or the positive electrode current collector and the intermediate layer, and hence the electrical connection between the positive electrode mixture layer and the positive electrode current collector via the intermediate layer is maintained to rise heat generation temperature of the secondary battery as compared to a case where the above range is satisfied. When the content of the thermally expandable material in the intermediate layer is 5 mass % or more, in the case of the thermally expandable material having conductivity, the thermally expandable material itself becomes a short circuit material and generates heat, and hence heat generation temperature of the secondary battery rises as compared to a case where the above range is satisfied.

The intermediate layer preferably includes the conductive material. Thereby, the conductivity of the intermediate layer is improved. Therefore, in a normal case where no short circuit occurs, the electrical connection between the positive electrode mixture layer and the positive electrode current collector via the intermediate layer may be improved to improve the output characteristics. When the thermally expandable material has conductivity, the conductive material is not necessarily required.

[Negative Electrode]

The negative electrode comprises, for example, the negative electrode current collector, such as the metal foil, and the negative electrode mixture layer formed on the negative electrode current collector. As the negative electrode current collector, the metal foil that is stable in the potential range of the negative electrode such as copper, the film in which the metal is disposed on the surface layer, and the like can be used. The negative electrode mixture layer includes, for example, the negative electrode active material, the binder, the thickener, and the like.

The negative electrode is obtained, for example, by applying and drying the negative electrode mixture slurry including the negative electrode active material, the thickener, and the binder on the negative electrode current collector to form the negative electrode mixture layer on the negative electrode current collector and by rolling the negative electrode mixture layer. The negative electrode mixture layer may be provided on the both surfaces of the negative electrode current collector.

The negative electrode active material is not particularly limited as long as it is a material capable of absorbing and desorbing lithium ions, and examples thereof include lithium alloy such as metallic lithium, lithium-aluminum alloy, lithium-lead alloy, lithium-silicon alloy, and lithium-tin alloy; carbon materials such as graphite, coke, and organic sintered body; and metal oxides such as $SnO_2$, SnO, and $TiO_2$. These may be used singly or in combinations of two or more.

As the binder included in the negative electrode mixture layer, a fluorine resin, PAN, a polyimide resin, an acrylic resin, a polyolefin resin, or the like can be used as in the case of the positive electrode. When the negative electrode mixture slurry is prepared using an aqueous solvent, styrene-butadiene rubber (SBR), CMC or a salt thereof, polyacrylic acid (PAA) or a salt thereof (which may be PAA-Na, PAA-K, or the like and a partially neutralized salt), polyvinyl alcohol (PVA), and the like are preferably used.

[Separator]

As the separator, for example, a porous sheet or the like having ion permeability and an insulating property is used. Specific examples of the porous sheet include a microporous thin film, a woven fabric, and a non-woven fabric. As the material of the separator, olefin resins such as polyethylene and polypropylene, cellulose, and the like are suitable. The separator may be a laminate having a cellulose fiber layer and a thermoplastic resin fiber layer such as an olefin resin. A multilayer separator including a polyethylene layer and a polypropylene layer may be used, and a separator applied with a material such as an aramid resin or a ceramic on the surface thereof may be used.

[Electrolyte]

The electrolyte includes a solvent and an electrolyte salt dissolved in the solvent. The electrolyte is not limited to a liquid electrolyte such as a non-aqueous electrolyte (non-aqueous solvent) and may be a solid electrolyte using a gel-like polymer or the like. As the non-aqueous solvent, for example, esters, ethers, nitriles such as acetonitrile, amides such as dimethylformamide, and mixed solvents of these two or more can be used. The non-aqueous solvent may contain a halogen substitute in which at least a part of hydrogen of these solvents is substituted with a halogen atom such as fluorine.

Examples of the above esters include cyclic carbonates such as ethylene carbonate (EC), propylene carbonate (PC), and butylene carbonate; linear carbonates such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylic acid esters such as γ-butyrolactone and γ-valerolactone; and linear carboxylic acid esters such as methyl acetate, ethyl acetate, propyl acetate, methyl propionate (MP), and ethyl propionate.

Examples of the above ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methyl furan, 1,8-cineole, and crown ether; and linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

As the above halogen substitute, fluorinated cyclic carbonates such as fluoroethylene carbonate (FEC); fluorinated linear carbonate; and fluorinated linear rubonic acid esters such as methyl fluoropropionate (FMP) are preferably used.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_6\text{-}x\ (C_nF_{2n+1})x$ ($1<x<6$, n is 1 or 2), $LiB_{10}Cl_{10}$, LiCl, LiBr, LiI, chloroborane lithium, lower aliphatic carboxylic acid lithium, $Li_2B_4O_7$, borates such as $Li(B(C_2O_4)F_2)$, $LiN(SO_2CF_3)_2$, and imide salts such as $LiN(C_lF_{2l+1}SO_2)(C_mF_{2m+1}SO_2)$ (l and m are an integer of 1 or more). For the lithium salt, these may be used singly, or a mixture of various lithium salts may be used. Among them, $LiPF_6$ is preferably used from the viewpoints such as ion conductivity and electrochemical stability. The concentration of the lithium salt is preferably 0.8 to 1.8 mol per liter of a solvent.

EXAMPLES

Hereinafter, the present disclosure will be described in more detail with reference to Examples, but the present disclosure is not limited to the following Examples.

Example 1

[Production of Positive Electrode]

93.5 parts by mass of aluminum oxide ($Al_2O_3$), 5 parts by mass of acetylene black (AB), and 1.5 parts by mass of polyvinylidene fluoride (PVDF) were mixed, and an appropriate amount of N-methyl-2-pyrrolidone (NMP) was further added to prepare a slurry for intermediate layer. The slurry was applied on both surfaces of the positive electrode current collector consisting of aluminum foil with a thickness of 15 and was dried to form an intermediate layer with a thickness of 5.0 μm.

As a positive electrode active material, a lithium nickel composite oxide represented by $LiNi_{0.5}Co_{0.2}Mn_{0.3}O_2$ was used. 1 part by mass of expanded graphite, 93 parts by mass of the positive electrode active material, 5 parts by mass of acetylene black (AB), and 1 part by mass of polyvinylidene fluoride (PVDF) were mixed, and then an appropriate amount of N-methyl-2-pyrrolidone (NMP) was added to prepare a positive electrode mixture slurry. This positive electrode mixture slurry was applied on the intermediate layers formed on both surfaces of the positive electrode current collector. The obtained film was dried and rolled using a rolling roller to produce a positive electrode consisting of a positive electrode current collector, an intermediate layer formed on both surfaces of the positive electrode current collector, and a positive electrode mixture layer formed on the intermediate layer.

[Production of Negative Electrode]

98.7 parts by mass of graphite powder, 0.7 parts by mass of carboxymethylcellulose (CMC), and 0.6 parts by mass of styrene-butadiene rubber (SBR) were mixed, and an appropriate amount of water was further added to prepare a negative electrode mixture slurry. Thereafter, the negative electrode mixture slurry was applied to both surfaces of a negative electrode current collector consisting of copper foil and was dried. This was cut into a predetermined electrode size and rolled using a roller to produce a negative electrode in which the negative electrode mixture layer was formed on both surfaces of the negative electrode current collector.

[Preparation of Electrolyte]

Ethylene carbonate (EC), methyl ethyl carbonate (EMC), and dimethyl carbonate (DMC) were mixed in a volume ratio of 3:3:4. A non-aqueous electrolyte was prepared by dissolving $LiPF_6$ in the mixed solvent so as to have a concentration of 1.2 mol/L.

[Production of Non-Aqueous Electrolyte Secondary Battery]

An aluminum lead was attached to the positive electrode, a nickel lead was attached to the negative electrode, and the positive electrode and the negative electrode were spirally wound via a polyethylene separator to produce a wound electrode body. The electrode body was accommodated in a bottomed cylindrical battery case main body, and after the above non-aqueous electrolyte was injected, the opening of the battery case main body was sealed with a gasket and a sealing body. This was the non-aqueous electrolyte secondary battery in Example 1.

Example 2

A positive electrode was produced in the same manner as in Example 1, except that 0.5 parts by mass of the above expanded graphite, 93.5 parts by mass of the above positive electrode active material, 5 parts by mass of acetylene black (AB), and 1 part by mass of polyvinylidene fluoride (PVDF) were mixed and then an appropriate amount of N-methyl-2-pyrrolidone (NMP) was added to prepare a positive electrode mixture slurry. Using this as the positive electrode in Example 2, a non-aqueous electrolyte secondary battery was produced in the same manner as in Example 1.

Example 3

A positive electrode was produced in the same manner as in Example 1, except that 1 part by mass of the above expanded graphite, 92.5 parts by mass of aluminum oxide ($Al_2O_3$), 5 parts by mass of acetylene black (AB), and 1.5 parts by mass of polyvinylidene fluoride (PVDF) were mixed and then an appropriate amount of N-methyl-2-pyrrolidone (NMP) was further added to prepare a slurry for the intermediate layer, and 94 parts by mass of the above positive electrode active material, 5 parts by mass of acetylene black (AB) and 1 part by mass of polyvinylidene fluoride (PVDF) were mixed and then an appropriate amount of N-methyl-2-pyrrolidone (NMP) was added to prepare a positive electrode mixture slurry. Using this as the positive electrode in Example 3, a non-aqueous electrolyte secondary battery was produced in the same manner as in Example 1.

Example 4

A positive electrode was produced in the same manner as in Example 1, except that 0.5 parts by mass of the above expanded graphite, 93.0 parts by mass of aluminum oxide (Al$_2$O$_3$), 5 parts by mass of acetylene black (AB), and 1.5 parts by mass of polyvinylidene fluoride (PVDF) were mixed and then an appropriate amount of N-methyl-2-pyrrolidone (NMP) was further added to prepare a slurry for the intermediate layer, and 94 parts by mass of the above positive electrode active material, 5 parts by mass of acetylene black (AB) and 1 part by mass of polyvinylidene fluoride (PVDF) were mixed and then an appropriate amount of N-methyl-2-pyrrolidone (NMP) was added to prepare a positive electrode mixture slurry. Using this as the positive electrode in Example 4, a non-aqueous electrolyte secondary battery was produced in the same manner as in Example 1.

Comparative Example 1

A positive electrode was produced in the same manner as in Example 1, except that 94 parts by mass of the above positive electrode active material, 5 parts by mass of acetylene black (AB), and 1 part by mass of polyvinylidene fluoride (PVDF) were mixed and then an appropriate amount of N-methyl-2-pyrrolidone (NMP) was added to prepare a positive electrode mixture slurry. Using this as the positive electrode in Comparative Example 1, a non-aqueous electrolyte secondary battery was produced in the same manner as in Example 1.

Comparative Example 2

A positive electrode was produced in the same manner as in Example 1, except that no intermediate layer was provided, 10 parts by mass of the above expanded graphite, 84 parts by mass of the above positive electrode active material, 5 parts by mass of acetylene black (AB), and 1 part by mass of polyvinylidene fluoride (PVDF) were mixed, and then an appropriate amount of N-methyl-2-pyrrolidone (NMP) was added to prepare a positive electrode mixture slurry. Using this as the positive electrode in Comparative Example 2, a non-aqueous electrolyte secondary battery was produced in the same manner as in Example 1.

Comparative Example 3

A positive electrode was produced in the same manner as in Example 1, except that no intermediate layer was provided, 5 parts by mass of the above expanded graphite, 89 parts by mass of the above positive electrode active material, 5 parts by mass of acetylene black (AB), and 1 part by mass of polyvinylidene fluoride (PVDF) were mixed, and then an appropriate amount of N-methyl-2-pyrrolidone (NMP) was added to prepare a positive electrode mixture slurry. Using this as the positive electrode in Comparative Example 3, a non-aqueous electrolyte secondary battery was produced in the same manner as in Example 1.

Comparative Example 4

A positive electrode was produced in the same manner as in Example 1 except that no intermediate layer was provided. Using this as the positive electrode in Comparative Example 4, a non-aqueous electrolyte secondary battery was produced in the same manner as in Example 1.

Comparative Example 5

A positive electrode was produced in the same manner as in Example 1, except that no intermediate layer was provided, 0.5 parts by mass of the above expanded graphite, 93.5 parts by mass of the above positive electrode active material, 5 parts by mass of acetylene black (AB), and 1 part by mass of polyvinylidene fluoride (PVDF) were mixed, and then an appropriate amount of N-methyl-2-pyrrolidone (NMP) was added to prepare a positive electrode mixture slurry. Using this as the positive electrode in Comparative Example 5, a non-aqueous electrolyte secondary battery was produced in the same manner as in Example 1.

Comparative Example 6

A positive electrode was produced in the same manner as in Example 1, except that 94 parts by mass of the above positive electrode active material, 5 parts by mass of acetylene black (AB), and 1 part by mass of polyvinylidene fluoride (PVDF) were mixed and then an appropriate amount of N-methyl-2-pyrrolidone (NMP) was added to prepare a positive electrode mixture slurry. Using this as the positive electrode in Comparative Example 6, a non-aqueous electrolyte secondary battery was produced in the same manner as in Example 1.

Comparative Example 7

A positive electrode was produced in the same manner as in Example 1, except that 10 parts by mass of the above expanded graphite, 84 parts by mass of the above positive electrode active material, 5 parts by mass of acetylene black (AB), and 1 part by mass of polyvinylidene fluoride (PVDF) were mixed and then an appropriate amount of N-methyl-2-pyrrolidone (NMP) was added to prepare a positive electrode mixture slurry. Using this as the positive electrode in Comparative Example 7, a non-aqueous electrolyte secondary battery was produced in the same manner as in Example 1.

Comparative Example 8

A positive electrode was produced in the same manner as in Example 1, except that 5 parts by mass of the above expanded graphite, 89 parts by mass of the above positive electrode active material, 5 parts by mass of acetylene black (AB), and 1 part by mass of polyvinylidene fluoride (PVDF) were mixed and then an appropriate amount of N-methyl-2-pyrrolidone (NMP) was added to prepare a positive electrode mixture slurry. Using this as the positive electrode in Comparative Example 8, a non-aqueous electrolyte secondary battery was produced in the same manner as in Example 1.

Comparative Example 9

A positive electrode was produced in the same manner as in Example 1, except that 10 parts by mass of the above expanded graphite, 83.5 parts by mass of aluminum oxide (Al$_2$O$_3$), 5 parts by mass of acetylene black (AB), and 1.5 parts by mass of polyvinylidene fluoride (PVDF) were mixed and then an appropriate amount of N-methyl-2-pyrrolidone (NMP) was further added to prepare a slurry for the intermediate layer, and 94 parts by mass of the above positive electrode active material, 5 parts by mass of acetylene black (AB) and 1 part by mass of polyvinylidene fluoride (PVDF) were mixed and then an appropriate amount of N-methyl-2-pyrrolidone (NMP) was added to prepare a positive electrode mixture slurry. Using this as the positive electrode in Comparative Example 9, a non-aqueous electrolyte secondary battery was produced in the same manner as in Example 1.

Comparative Example 10

A positive electrode was produced in the same manner as in Example 1, except that 5 parts by mass of the above expanded graphite, 88.5 parts by mass of aluminum oxide ($Al_2O_3$), 5 parts by mass of acetylene black (AB), and 1.5 parts by mass of polyvinylidene fluoride (PVDF) were mixed and then an appropriate amount of N-methyl-2-pyrrolidone (NMP) was further added to prepare a slurry for the intermediate layer, and 94 parts by mass of the above positive electrode active material, 5 parts by mass of acetylene black (AB) and 1 part by mass of polyvinylidene fluoride (PVDF) were mixed and then an appropriate amount of N-methyl-2-pyrrolidone (NMP) was added to prepare a positive electrode mixture slurry. Using this as the positive electrode in Comparative Example 10, a non-aqueous electrolyte secondary battery was produced in the same manner as in Example 1.

[Nailing Test]

The nailing test of the following procedure was performed about the non-aqueous electrolyte secondary battery of each Example and Comparative Example, and the highest attainable temperature of each non-aqueous electrolyte secondary battery at the time of an internal short circuit was measured. (1) Charging was performed until the battery voltage reached 4.2 V at a constant current of 0.3 C (600 mA) under an environment of 25° C., and then charging was continued until the current value reached 0.05 C (90 mA) at a constant voltage. (2) Under an environment of 25° C., the tip of a round nail having a 3 mmφ diameter was contacted with the center portion in the side surface of the battery charged in (1), the round nail pierced thereto in the diameter direction of the battery at a rate of 10 mm/sec, and the round nail was stopped to pierce when the round nail completely penetrated the battery. (3) The highest attainable temperature was determined by measuring the battery temperature at a position of 10 mm away from the center portion in the side surface of the battery where the round nail pierced.

Table 1 shows the mass ratio of each component of the intermediate layer and the positive electrode mixture layer of the positive electrode used in each Example and Comparative Example and results of the highest attainable temperature of non-aqueous electrolyte secondary battery of each Example and Comparative Example in the nailing test.

TABLE 1

| | Intermediate layer Mass ratio (expanded graphite/ $Al_2O_3$/AB/PVDF) | Positive electrode mixture layer Mass ratio (expanded graphite/ positive electrode active material/ AB/PVDF) | Nailing test Highest attainable temperature (° C.) |
|---|---|---|---|
| Example 1 | 0/93.5/5/1.5 | 1/93/5/1 | <500 |
| Example 2 | 0/93.5/5/1.5 | 0.5/93.5/5/1 | <500 |
| Example 3 | 1/92.5/5/1.5 | 0/94/5/1 | <500 |
| Example 4 | 0.5/93/5/1.5 | 0/94/5/1 | <500 |
| Comparative Example 1 | — | 0/94/5/1 | >600 |
| Comparative Example 2 | — | 10/84/5/1 | >600 |
| Comparative Example 3 | — | 5/89/5/1 | >600 |
| Comparative Example 4 | — | 1/93/5/1 | >600 |
| Comparative Example 5 | — | 0.5/93.5/5/1 | >600 |
| Comparative Example 6 | 0/93.5/5/1.5 | 0/94/5/1 | 500-600 |
| Comparative Example 7 | 0/93.5/5/1.5 | 10/84/5/1 | 500-600 |
| Comparative Example 8 | 0/93.5/5/1.5 | 5/89/5/1 | 500-600 |
| Comparative Example 9 | 10/83.5/5/1.5 | 0/94/5/1 | 500-600 |
| Comparative Example 10 | 5/88.5/5/1.5 | 0/94/5/1 | 500-600 |

The non-aqueous electrolyte secondary batteries in Comparative Examples 1 to 5 having no intermediate layer had a highest attainable temperature of 600° C. or more at the time of an internal short circuit. In the non-aqueous electrolyte secondary battery according to Comparative Examples 6 to 8 having an intermediate layer including the insulating inorganic material and the conductive agent, but including no thermally expandable material in the positive electrode mixture layer, or having the content of 5 mass % or more, and in the non-aqueous electrolyte secondary battery according to Comparative Examples 9 and 10 having the intermediate layer including the thermally expandable material and the insulating inorganic material and having the content of the thermally expandable material of 5 mass % or more, the highest attainable temperature at the time of an internal short circuit was 500 to 600° C. On the other hand, in the non-aqueous electrolyte secondary battery according to Examples 1 and 2 having the content of the thermally expandable material in the positive electrode mixture layer of 0.1 mass % or more and less than 5 mass % and having the content of the insulating inorganic material of 80 mass % or more and 99 mass % or less in the intermediate layer including the insulating inorganic material and the conductive agent, and in the non-aqueous electrolyte secondary battery according to Examples 3 and 4 having the content of the insulating inorganic material of 80 mass % or more and 99 mass % or less and having the content of the thermally expandable material of 0.1 mass % or more and less than 5 mass % in the intermediate layer including the thermally expandable material and the insulating inorganic material, the highest attainable temperature at the time of an internal short circuit was less than 500° C. Therefore, the non-aqueous electrolyte secondary batteries in Examples 1 to 4 can suppress a rise in the heat generation temperature of the non-aqueous electrolyte secondary battery at the time of an internal short circuit and reduce the highest attainable temperature of the non-aqueous electrolyte secondary battery.

REFERENCE SIGNS LIST

10 Secondary battery
11 Positive electrode
12 Negative electrode
13 Separator
14 Electrode body
15 Case main body 16 Sealing body
17, 18 Insulating plate
19 Positive electrode lead
20 Negative electrode lead
21 Projecting portion
22 Filter
22a Opening of filter
23 Lower valve body
24 Insulating member
25 Upper valve body
26 Cap
26a Opening of cap
27 Gasket
30 Positive electrode current collector
31 Intermediate layer
32 Positive electrode mixture layer

The invention claimed is:

1. A secondary battery, comprising:
a positive electrode;
a negative electrode; and
an electrolyte, wherein
the positive electrode includes a positive electrode current collector, an intermediate layer formed on the positive electrode current collector, and a positive electrode mixture layer formed on the intermediate layer;
the positive electrode mixture layer includes a positive electrode active material and 0.1 mass % or more and less than 5 mass % of a thermally expandable material, wherein the positive electrode active material is one selected from the group consisting of $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (M: at least one of Na, Mg, Sc, Y, Mn, Fe, Co, Ni, Cu, Zn, Al, Cr, Pb, Sb, and B, $0<x\leq1.2$, $0<y\leq0.9$, and $2.0\leq z\leq2.3$), and combinations thereof;
the intermediate layer includes a conductive agent and 80 mass % or more and 99 mass % or less of an insulating inorganic material; and
the thermally expandable material includes expandable graphite treated with at least one of the group consisting of concentrated sulfuric acid, nitric acid and selenic acid, and at least one of the group consisting of concentrated nitric acid, perchlorate, permanganate and dichromate so as to form crystalline compounds having a graphitic layer structure which when a predetermined temperature is reached are volumetrically expanded by a gas generated by heat to form a nonflammable carbonized layer,
wherein the positive electrode mixture layer further includes a conductive material, and the thermally expandable material has larger volume expansion due to heat than the conductive material.

2. The secondary battery according to claim 1, wherein a thickness of the intermediate layer is 1 μm or more and 5 μm or less.

3. The secondary battery according to claim 1, wherein the insulating inorganic material includes at least one of aluminum oxide, titanium oxide, zirconium oxide, silicon oxide, manganese oxide, magnesium oxide, nickel oxide, boron nitride, aluminum nitride, magnesium nitride, silicon nitride, aluminum fluoride, lithium fluoride, sodium fluoride, magnesium fluoride, calcium fluoride, barium fluoride, aluminum hydroxide, and boehmite.

4. The secondary battery according to claim 1, wherein a content of the thermally expandable material in the positive electrode mixture layer is 0.1 mass % or more and 1 mass % or less.

5. The secondary battery according to claim 1, wherein an average particle size of the expandable graphite is 1 to 500 μm, and the expansion volume of the expandable graphite is 10 to 300 mL/g.

6. The secondary battery according to claim 1,
wherein the conductive material includes a carbon material selected from the group consisting of carbon black (CB), acetylene black (AB), ketjen black, graphite, and combinations thereof.

7. A secondary battery, comprising:
a positive electrode;
a negative electrode; and
an electrolyte, wherein
the positive electrode includes a positive electrode current collector, an intermediate layer formed on the positive electrode current collector, and a positive electrode mixture layer formed on the intermediate layer;
the positive electrode mixture layer includes a positive electrode active material;
the intermediate layer includes 0.1 mass % or more and less than 5 mass % of a thermally expandable material and 80 mass % or more and 99 mass % or less of an insulating inorganic material; and
the thermally expandable material includes expandable graphite treated with at least one of the group consisting of concentrated sulfuric acid, nitric acid and selenic acid, and at least one of the group consisting of concentrated nitric acid, perchlorate, permanganate and dichromate so as to form crystalline compounds having a graphitic layer structure which when a predetermined temperature is reached are volumetrically expanded by a gas generated by heat to form a nonflammable carbonized layer,
wherein the intermediate layer further includes a conductive agent, and the thermally expandable material has larger volume expansion due to heat than the conductive agent.

8. The secondary battery according to claim 7, wherein a thickness of the intermediate layer is 1 μm or more and 5 μm or less.

9. The secondary battery according to claim 7, wherein the insulating inorganic material includes at least one of aluminum oxide, titanium oxide, zirconium oxide, silicon oxide, manganese oxide, magnesium oxide, nickel oxide, boron nitride, aluminum nitride, magnesium nitride, silicon nitride, aluminum fluoride, lithium fluoride, sodium fluoride, magnesium fluoride, calcium fluoride, barium fluoride, aluminum hydroxide, and boehmite.

10. The secondary battery according to claim 7, wherein a content of the thermally expandable material in the intermediate layer is 0.1 mass % or more and 1 mass % or less.

11. The secondary battery according to claim 7, wherein an average particle size of the expandable graphite is 1 to 500 μm, and the expansion volume of the expandable graphite is 10 to 300 mL/g.

12. The secondary battery according to claim 7,
wherein the conductive agent includes a carbon material selected from the group consisting of carbon black (CB), acetylene black (AB), ketjen black, graphite, and combinations thereof.

* * * * *